United States Patent
Jiang et al.

(10) Patent No.: US 11,128,148 B2
(45) Date of Patent: Sep. 21, 2021

(54) REVERSE CHARGING DEVICE, AND METHOD AND DEVICE FOR REGULATING REVERSE CHARGING CURRENT

(71) Applicant: Beijing Xiaomi Mobile Software Co., Ltd., Beijing (CN)

(72) Inventors: Fei Jiang, Beijing (CN); Ping Qian, Beijing (CN); Xin Xiong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 327 days.

(21) Appl. No.: 16/233,472

(22) Filed: Dec. 27, 2018

(65) Prior Publication Data
US 2020/0028373 A1    Jan. 23, 2020

(30) Foreign Application Priority Data
Jul. 17, 2018    (CN) .......................... 201810786273.1

(51) Int. Cl.
*G06F 1/26* (2006.01)
*H02J 7/00* (2006.01)
*G06F 13/40* (2006.01)

(52) U.S. Cl.
CPC ............... *H02J 7/00* (2013.01); *G06F 1/266* (2013.01); *G06F 13/4027* (2013.01); *H02J 7/0045* (2013.01)

(58) Field of Classification Search
CPC ........................................................ G06F 1/266
USPC ......................................................... 320/103
See application file for complete search history.

(56) References Cited

U.S. PATENT DOCUMENTS

| 2009/0100275 A1 | 4/2009 | Chang et al. |
| 2010/0219790 A1* | 9/2010 | Chadbourne ........... G06F 1/266 320/107 |
| 2012/0293136 A1* | 11/2012 | Chen ...................... G06F 1/266 320/162 |
| 2015/0005976 A1* | 1/2015 | Akebono ............... G05B 15/02 700/297 |
| 2015/0280486 A1 | 10/2015 | Hsu |

(Continued)

FOREIGN PATENT DOCUMENTS

| CN | 104953631 A | 9/2015 |
| CN | 204883583 U | 12/2015 |

(Continued)

OTHER PUBLICATIONS

English version of International Search Report of PCT/CN2018/106997, issued by the ISA/CN—State Intellectual Property Office of the P. R. China, dated Apr. 22, 2019.

(Continued)

*Primary Examiner* — Edward Tso
*Assistant Examiner* — Ahmed H Omar
(74) *Attorney, Agent, or Firm* — Finnegan, Henderson, Farabow, Garrett & Dunner, L.L.P.

(57) ABSTRACT

A reverse charging device includes a processor, a standard downstream port (SDP) and a first link on which a charging downstream port (CDP) interface chip is arranged. When it is detected that an adapter is plugged into the SDP, the processor is connected with the SDP through the first link, and the processor, the CDP interface chip, and the SDP form a CDP to perform reverse charging through the CDP and the adapter, wherein the CDP has a current transmission capability higher than the SDP.

15 Claims, 6 Drawing Sheets

(56) References Cited

U.S. PATENT DOCUMENTS

2017/0277251 A1* 9/2017 Gong .................. G06F 1/266
2018/0074564 A1  3/2018 Paparrizos et al.

FOREIGN PATENT DOCUMENTS

| CN | 105591440 A | 5/2016 |
| CN | 105896679 A | 8/2016 |
| CN | 106026247 A | 10/2016 |
| CN | 106201966 A | 12/2016 |
| CN | 106329627 A | 1/2017 |
| CN | 106374567 A | 2/2017 |
| CN | 106502558 A | 3/2017 |
| CN | 106655316 A | 5/2017 |
| CN | 106685018 A | 5/2017 |
| CN | 106712179 A | 5/2017 |
| CN | 108631401 A | 10/2018 |
| JP | 2004178608 A | 6/2004 |
| JP | 2005287278 A | 10/2005 |
| JP | 2013169062 A | 8/2013 |
| JP | 2013254408 A | 12/2013 |

OTHER PUBLICATIONS

Partial Supplementary European Search Report for European Application No. 19184901.7 from the European Patent Office, dated Nov. 12, 2019.

Extended European Search Report for European Application No. 19184901.7, from the European Patent Office, dated Mar. 17, 2020.

First Office Action in Chinese Application No. 201810786273.1, from the State Intellectual Property Office of P. R. China, dated Mar. 30, 2020.

First Office Action of Japanese Application No. 2019-551270, dated Nov. 26, 2020.

European Search Report in European application No. 20197804.6, dated Dec. 16, 2020.

First Office Action of Korean Application No. 10-2019-7027044, dated Jan. 27, 2021.

Notice of Reasons for Refusal dated Jun. 11, 2021, from Japanese Patent Office in counterpart Japanese Application No. 2019-551270.

* cited by examiner

REVERSE CHARGING DEVICE, AND METHOD AND DEVICE FOR REGULATING REVERSE CHARGING CURRENT

CROSS-REFERENCE TO RELATED APPLICATION

This application is based upon and claims priority to Chinese Patent Application No. 201810786273.1, filed on Jul. 17, 2018, the entire contents of which are incorporated herein by reference.

TECHNICAL FIELD

The present disclosure generally relates to the technical field of terminal devices, and more particularly, to a reverse charging device and a method and device for regulating a reverse charging current.

BACKGROUND

In modern lives, mobile phones become an indispensable article in people's life. Along with increase of service time, power of a battery of a mobile phone keeps dropping, and then the mobile phone needs to be charged. However, in many scenarios, for example, a user drinks coffee in a coffee bar or takes a public transportation means, the user may not timely charge a mobile phone with a charger. In such cases, the user may reversely charge the mobile phone by use of another mobile phone, a tablet computer or the like.

At present, most of commercially available mobile phones are standard downstream port (SDP) type mobile phones, i.e., mobile phones of which data ports are SDP ports. Under restrictions of an SDP port communication protocol, a maximum reverse charging current value between the two mobile phones is only 500 mA after two SDP mobile phones are connected by use of an On-The-Go (OTG) adapter, so that a charging speed is relatively low and may not meet a rapid charging requirement of a user.

SUMMARY

According to a first aspect of embodiments of the present disclosure, there is provided a reverse charging device. The device may include a processor, a standard downstream port (SDP), and a first link on which a charging downstream port (CDP) interface chip is arranged, wherein when it is detected that an adapter is plugged into the SDP, the processor may be connected with the SDP through the first link, and the processor, the CDP interface chip, and the SDP form a CDP to perform reverse charging through the CDP and the adapter, the CDP having a current transmission capability higher than the SDP.

According to a second aspect of the embodiments of the present disclosure, there is provided a method for regulating a reverse charging current. The method may be applied to a first terminal device and include that: a total current value is acquired in a process of reversely charging a second terminal device through an adapter, the total current value including a reverse charging current value and a value of current consumed by one or more application programs running on the first terminal device; the total current value is compared with a rated current value of a battery; and when the total current value is kept higher than the rated current value for a preset time period, the reverse charging current value is decreased.

According to a third aspect of the embodiments of the present disclosure, there is provided a first terminal device. The first terminal device may include: a processor; and a memory configured to store an instruction executable by the processor, wherein the processor may be configured to: acquire a total current value in a process of reversely charging a second terminal device through an adapter, the total current value including a reverse charging current value and a value of current consumed by one or more application programs running on the first terminal device; compare the total current value with a rated current value of a battery; and when the total current value is kept higher than the rated current value for a preset time period, decrease the reverse charging current value.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
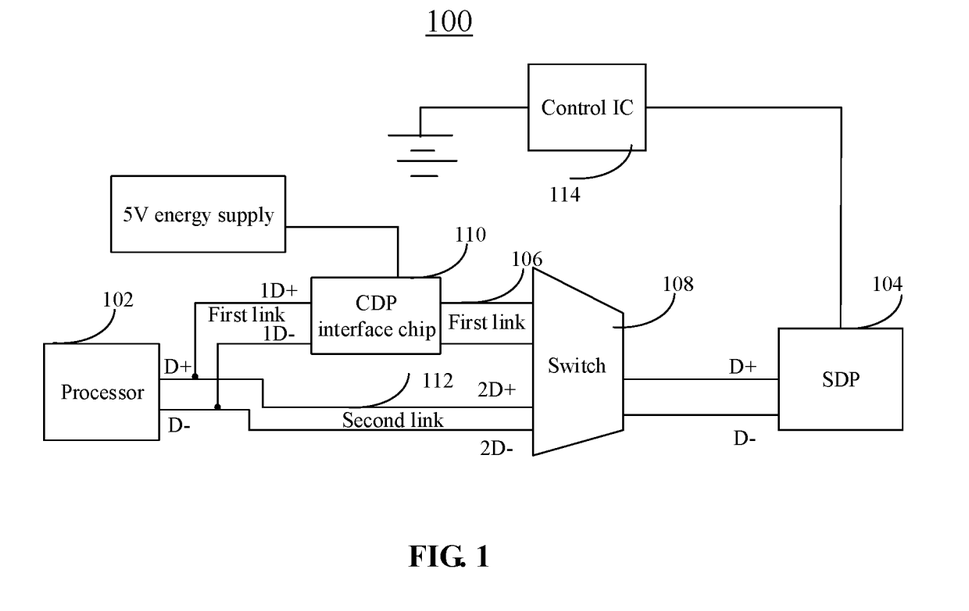
FIG. 1 is a schematic diagram of a reverse charging device according to an exemplary embodiment.

An embodiment of the present disclosure provides a reverse charging device 100. Referring to FIG. 1, the device 100 includes a processor 102, a standard downstream port (SDP) 104, and a first link 106.

A D+ line and D− line of the processor 102 are connected with a 1D+ line and 1D− line of the first link 106, respectively. The 1D+ line and 1D− line of the first link 106 are connected with the SDP 104 through a switch 108. A charging downstream port (CDP) interface chip 110 is arranged on the first link 106. The CDP interface chip 110 may be TPS2547 and the like.

The processor 102 is configured to control forward charging and reverse charging of a battery. When it is detected that a data line plugged into the SDP 104 is an OTG adapter, the processor 102 controls the reverse charging device 100 to perform reverse charging through the OTG adapter. When it is detected that the data line plugged into the SDP 104 is a Universal Serial Bus (USB) data line (Type-A to Type-B data line), the processor 102 controls the reverse charging device 100 to perform forward charging through the USB data line.

The first link 106 is a reverse charging circuit and is configured to establish a current transmission path during reverse charging.

The switch 108 is configured to, after receiving a signal sent by the processor 102, determine a link connected with the SDP 104.

The SDP 104 is an external data port and the data line is plugged and unplugged to implement connection or disconnection between devices.

In the embodiment of the present disclosure, when it is detected that the OTG adapter is plugged into the SDP 104, the processor 102 is connected with the SDP 104 through the first link 106, and the processor 102 forms a CDP with the CDP interface chip 110 and the SDP 104 and performs reverse charging through the CDP and the OTG adapter.

Since it is specified in an SDP communication protocol that a maximum transmission current of the SDP is 500 milliampere (mA) and it is specified in a CDP communication protocol that a maximum transmission current is the CDP is 1.5 ampere (A), and the CDP has a current transmission capability higher than the SDP, therefore it may greatly increase a reverse charging current value by using the reverse charging device provided by the embodiments of the present disclosure.

In another embodiment of the present disclosure, the device 100 further includes a second link 112. The second link 112 is a charging circuit. The D+ line and D-line of the processor 102 are connected with a 2D+ line and 2D− line of the second link 112, respectively. The 2D2 line and 2D− line of the second link 112 are connected with the SDP 104 through the switch 108. The processor 102 is connected with the SDP 104 through the second link 112 and performs forward charging on the basis of an established connection.

In another embodiment of the present disclosure, the device 100 further includes a control IC 114. The control IC 114 is configured for overcurrent protection during forward charging or reverse charging. For example, during reverse charging, the control IC 114 is configured as an OTG IC to control a current value of the reverse charging current. During forward charging, the control IC 114 is configured as a charge IC to control a current value of a forward charging current.

In another embodiment of the present disclosure, the device 100 further includes a parasitic diode (not shown). The parasitic diode is located between the processor 102 and the CDP interface chip 110 and may influence a waveform between the D+1 line and D− line of the processor 102 and reduce the forward charging or reverse charging current value. For increasing the forward charging or reverse charging current value, in the embodiment of the present disclosure, when it is detected that the USB data line is plugged into the SDP 104 or the OTG data line is plugged into the SDP during forward charging or reverse charging, the reverse charging device 100 further provides a preset voltage for the CDP interface chip 110. The preset voltage is usually 5V. The reverse charging device 100 reversely biases and turns off the parasitic diode by providing the preset voltage for the CDP interface chip 110 to eliminate the effect of capacitance of the parasitic diode. When it is not detected that the USB data line is plugged into the SDP 104 or it is not detected that the OTG data line is plugged into the SDP 104, namely in a normal use or standby process, the preset voltage may be stopped to be provided for the CDP interface chip 110 to reduce power consumption and optimize standby power consumption.

According to the device 100 provided by the embodiment of the present disclosure, the CDP interface chip 110 is arranged on the first link 106, so that when the OTG adapter is plugged into the SDP 106, the processor 102, the CDP interface chip 110, and the SDP 104 co-act to form a CDP. Since the CDP has a current transmission capability higher than the SDP, the reverse current value is higher than that output by a conventional reverse charging device.

Figure 2:
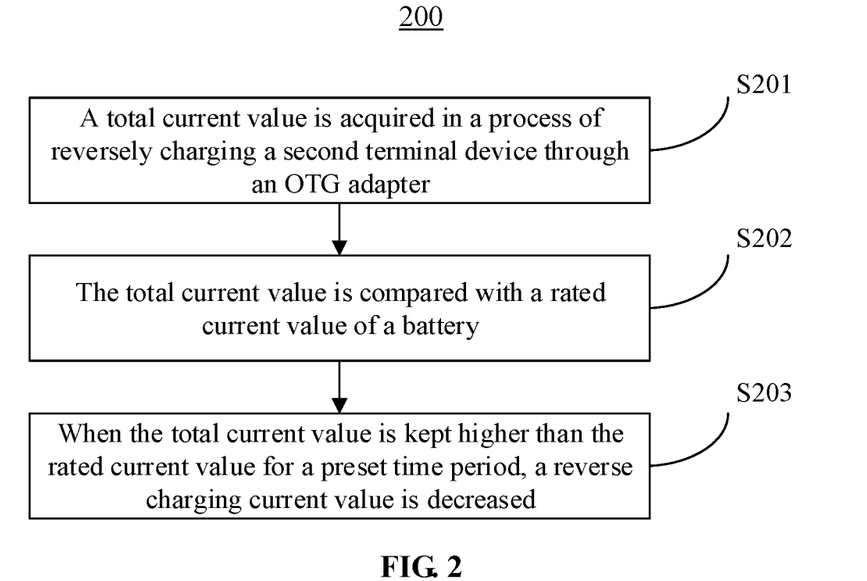
FIG. 2 is a flow chart of a method for regulating a reverse charging current according to an exemplary embodiment.

FIG. 2 is a flow chart of a method 200 for regulating a reverse charging current according to an exemplary embodiment. As shown in FIG. 2, the method 200 for regulating a reverse charging current is applied to a first terminal device with a reverse charging device and includes the following operations S201 to S203.

In S201, a total current value is acquired in a process of reversely charging a second terminal device through an OTG adapter.

The total current value includes a reverse charging current value and a value of current consumed by one or more application programs running on the first terminal device.

In S202, the total current value is compared with a rated current value of a battery.

In S203, when the total current value is kept higher than the rated current value for a preset time period, the reverse charging current value is decreased.

According to the method 200 provided by the embodiment of the present disclosure, the total current value of the first terminal device is acquired in real time in the process of reversely charging the second terminal device, and the reverse charging current is regulated according to a relationship between the total current value and the rated current value of the battery, so that charging safety is ensured, and in addition, service life of the battery is prolonged.

In another embodiment of the present disclosure, the operation that the reverse charging current value is decreased when the total current value is kept higher than the rated current value for the preset time period includes that: when the total current value is kept higher than the rated current value for a first preset time period, the reverse charging current value is decreased from a first current value to a second current value, the first current value being an initial current value for reverse charging of the second terminal device and the first current value being higher than the second current value.

In another embodiment of the present disclosure, after the operation that the reverse charging current value is decreased from the first current value to the second current value, the method further includes that: when the total current value is kept higher than the rated current value for a second preset time period, the reverse charging current value is decreased from the second current value to a third current value, the second current value being higher than the third current value.

In another embodiment of the present disclosure, after the operation that the reverse charging current value is decreased from the second current value to the third current value, the method further includes that: when the total current value is kept higher than the rated current value for a third preset time period, the second terminal device is stopped to be reversely charged.

In another embodiment of the present disclosure, after the operation that the reverse charging current value is decreased, the method further includes that: when it is detected that the total current value is kept lower than a specified current value for a fourth preset time period, the second terminal device is reversely charged with the first current value, the first current value being the initial current value for reverse charging of the second terminal device.

In another embodiment of the present disclosure, after the operation that the reverse charging current value is decreased, the method further includes that: when a plugging and unplugging operation over the OTG adapter is detected, the second terminal device is reversely charged with the first current value, the first current value being the initial current value for reverse charging of the second terminal device.

All of the optional technical solutions may be freely combined into optional embodiments of the present disclosure.

Figure 3:
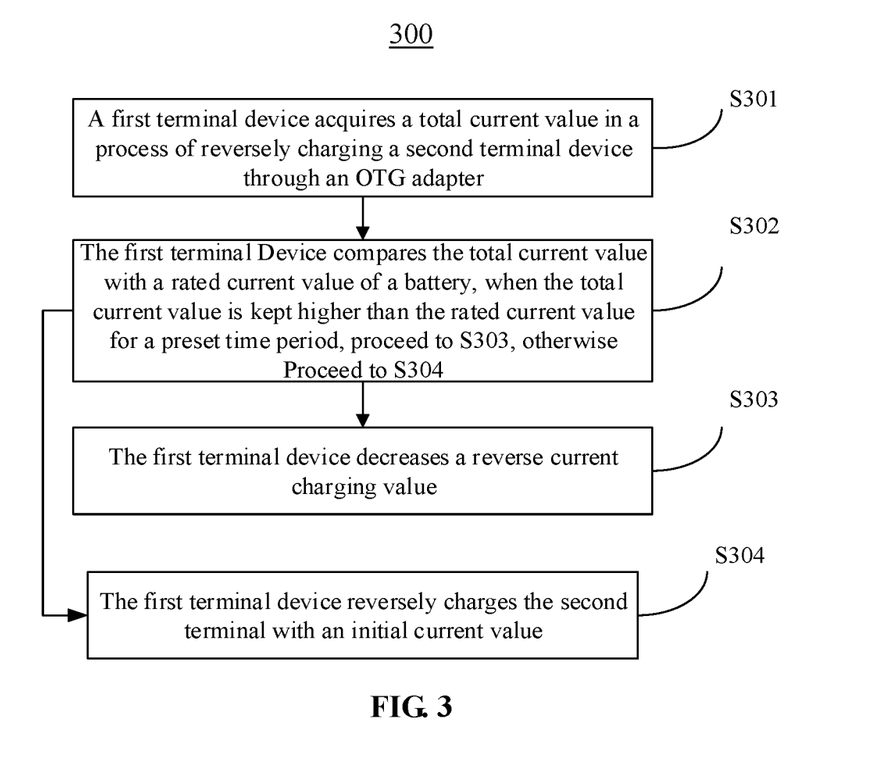
FIG. 3 is a flow chart of a method for regulating a reverse charging current according to an exemplary embodiment.

FIG. 3 is a flow chart showing a method 300 for regulating a reverse charging current according to an exemplary embodiment. As shown in FIG. 3, the method 300 for regulating a reverse charging current is applied to a first terminal device with a reverse charging device and includes the following operations S301 to S304.

In S301, the first terminal device acquires a total current value in a process of reversely charging a second terminal device through an OTG adapter.

The first terminal device is a charging mobile phone, the second terminal device is a mobile phone to be charged, and the first terminal device and the second terminal device may be mobile phones, tablet computers, notebook computers and the like. Product types of the first terminal device and the second terminal device are not specifically limited in the embodiment of the present disclosure. In exemplary embodiments, a battery of the first terminal device has a relatively high capacity capable of reaching 4,000 mA and even 5,000 mA or more.

When it is detected that the OTG adapter is plugged into an SDP, a first link is in an on state and a processor, CDP interface chip and SDP in the first terminal device co-act to form a CDP. When it is detected that the OTG adapter is plugged into the CDP, the second terminal device is forwards charged through the OTG and the first terminal device reversely charges the second terminal device through the OTG data line.

It is to be noted that multiple current values are involved in the embodiment of the present disclosure. An initial current value used by the first terminal device to reversely charge the second terminal device is determined as a first current value, and the first current value may be 1.5 A. A current value obtained after the first current value is decreased is determined as a second current value, and the second current value may be 1 A. A current value obtained after the second current value is decreased is determined as a third current value, and the third current value may be 0.75 A.

For avoiding an excessively high total current value in a circuit of the first terminal device shortening service life of the battery in the first terminal device and even damaging the battery and protecting the battery in the first terminal device, the first terminal device further monitors the total current value in the first terminal device through an analog-to-digital converter (ADC) in the process of reversely charging the second terminal device through the OTG adapter. The total current value in the first terminal device is monitored to acquire the total current value in the first terminal device, the total current value including a reverse charging current value and a value of current consumed by one or more application programs running on the first terminal device. For example, when the reverse charging current value is 1.5 A and the value of current consumed by one or more application programs running on the first terminal device is 2 A, the total current value in the first terminal device is 3.5 A.

Specifically, when monitoring the total current value in the first terminal device, the first terminal device may monitor it at an interval of a preset duration and may also monitor it in real time. The preset duration may be 10 seconds, 20 seconds and the like. For saving energy, it is set in the embodiment of the present disclosure that the preset duration is 10 seconds and the total current value in the first terminal device is monitored every 10 seconds.

In S302, the first terminal device compares the total current value with a rated current value of a battery, when the total current value is kept higher than the rated current value for a preset time period, proceed to S303, otherwise proceed to S304.

The rated current value may be a maximum continuous discharging current specified in a battery chip specification. When the total current value in the circuit is higher than the rated current value, the battery may have a potential safety hazard. Therefore, there is usually made such a requirement in a practical application process that the total current value in the circuit should not exceed the rated current value. The rated current value is determined by performance of the battery and may be 4 A, 5 A and the like.

The preset time period is a monitoring duration for limiting a reverse discharging current value in the embodiment of the present disclosure. The preset time period may be an integral multiple of the preset duration and may be 1 minute, 2 minutes and the like. For example, the preset duration is 10 seconds and the preset time period is 1 minute. According to a monitoring condition of the reverse discharging current value, the preset time period may include a first preset time period, a second preset time period, a third preset time period and the like. The first preset time period is a first current limiting monitoring duration, the second preset time period is a second current limiting monitoring duration and the third preset time period is a monitoring duration for determining whether to stop reverse charging or not.

In the embodiment of the present disclosure, a total battery value storage queue is maintained. The total battery value storage queue is a kernel work queue for the reverse charging current (i.e., discharging current) of the first terminal device and is configured to store the total current value acquired every time. On the basis of the total battery value storage queue, the first terminal device may statistically obtain a change condition of the total current value rapidly. In the embodiment of the present disclosure, the storage queue may be represented as an ibat queue. The first terminal device, when storing the acquired total current value in the ibat queue, may sequentially store the acquired total current value in the ibat queue according to an acquisition time sequence.

In an embodiment of the present disclosure, on the basis of the acquired total current value, the first terminal device may directly compare the total current value with the rated current value of the battery, when the total current value is kept higher than the rated current value for the preset time period, proceed to S303, otherwise proceed to S304.

In another embodiment of the present disclosure, in consideration of a certain error of the ADC and for better protecting the battery in the first terminal device, on the basis of the acquired total current value, the first terminal device may compare the total current value with a preset current value, the preset current value being determined according to the rated current value and an accuracy value of the ADC. For example, when the rated current value is 4.55 A and the accuracy value of the ADC is 50 mA, it may be determined that the preset current value is 4.5 A. When the rated current value is 3.62 A and the accuracy value of the ADC is 20 mA, it may be determined that the preset current value is 3.6 A. When the total current value is kept higher than the preset current value in the preset time period, S303 is executed, otherwise S304 is executed.

In S303, the first terminal device decreases a reverse charging current value.

During first current limiting monitoring, since the total current value is kept higher than the rated current value in the first preset time period, for avoiding battery burnout, the first terminal device may decrease the reverse charging current value from the first current value to the second current value. The first current value is the initial current value of reverse charging of the second terminal device and the first current value is higher than the second current value. For example, it is set that the first preset time period is 1 minute, when the second terminal device is reversely charged through the OTG adapter, the initial current value used by the first terminal device to reversely charge the second terminal device is 1.5 A, and during reverse charging, the first terminal device acquires the total current value and compares the total current value with the rated current value. Since the total current value is kept higher than the rated current value for 1 minute, for protecting the battery, the first terminal device decreases the reverse charging current value and decreases the reverse charging current value from 1.5 A to 1 A.

After the reverse charging current value is regulated for the first time, the first terminal device may continue monitoring the total current value in the circuit and, when monitoring that the total current value is kept higher than the rated current value in the second preset time period, decreases the reverse charging current value from the second current value to the third current value. The second current value is higher than the third current value. For example, it is set that the second preset time period is 2 minutes, after the first terminal device decreases the reverse charging current value from 1.5 A to 1 A by first current limiting, the first terminal device may continue monitoring the total current value in the circuit and, when the total current value is kept higher than the rated current value for 2 minutes, for protecting the battery, the first terminal device may continue decreasing the reverse charging current value and decreases the reverse charging current from 1 A to 0.75 A.

After second current limiting over the reverse charging current value, the first terminal device continues monitoring the total current value in the circuit and, when monitoring that the total current value is kept higher than the rated current value for the third preset time period, stops reversely charging the second terminal device. For example, it is set that the third preset time period is 1 minute, after the first terminal device limits the current twice to decrease the reverse charging current value to 0.75 A, the first terminal device continues monitoring the total current value in the circuit and, when the total current value is kept higher than the rated current value for 1 minute, for protecting the battery, the first terminal device may stop reversely charging the second terminal device.

It is to be noted that the operation that the total current value is compared with the rated current value to regulate the reverse charging current value is taken an example. Of course, the first terminal device may also compare the total current value with the preset current value to regulate the reverse charging current value and a specific comparison and regulation process refers to S303 and will not be elaborated herein.

In S304, the first terminal device reversely charges the second terminal device with an initial current value.

During first current limiting monitoring, when it is monitored that a duration when the total current value is kept higher than the rated current value is shorter than the first preset time period or the total current value is kept lower than the rated current value in the first preset time period, the first terminal device continues reversely charging the second terminal device with the initial current value to increase a charging speed of the second terminal device.

After the reverse charging current value for reverse charging of the second terminal device is limited, the first terminal device in the embodiment of the present disclosure is further provided with a reverse charging current value recovery mechanism and may recover the reverse charging current value to the initial current value, i.e., the first current value, on the basis of the charging current value recovery mechanism to increase the charging speed of reverse charging of the second terminal device. A principle of the reverse charging current value recovery mechanism is that: in the process of reversely charging the second terminal device through the OTG adapter line, when the reverse charging current is limited at least once and it is detected that the total current value is kept lower than a specified current value for a fourth preset time period, the first terminal device may reversely charge the second terminal device with the first current value. The fourth preset time period may be an integral multiple of a preset duration and may be 1 minute, 2 minutes, 3 minutes and the like. The specified current value may be 2.4 A, 2.6 A and the like. A magnitude of the specified current value is not specifically limited in the embodiment of the present disclosure.

Since the first terminal device limits the current at least once during reverse charging, a reverse charging current value recovery opportunity may be after first current limiting or second current limiting or third current limiting or the like. In one embodiment, after the first terminal device limits the reverse charging current once to decrease the reverse charging current value from the first current value to the second current value, the first terminal device continues monitoring the total current value and, when monitoring that the total current is kept lower than the specified current value for the fourth preset time period, reversely charges the second terminal device with the first current value. In one embodiment, after the first terminal device limits the reverse charging current twice to decrease the reverse charging current value from the second current value to the third current value, the first terminal device continues monitoring the total current value and, when monitoring that the total current value is kept lower than the specified current value for the fourth preset time period, reversely charges the second terminal device with the first current value. In one embodiment, after the second terminal device is stopped to be reversely charged, the first terminal device monitors that the total current value is kept lower than the specified current value for the fourth preset time period and then reversely charges the second terminal device with the first current value.

In exemplary embodiments, after the first terminal device recovers a maximum current output capability of the second terminal device, whether a maximum output current value may be used to reversely charge the second terminal device or not is also determined by whether the second terminal device supports a dynamic charging power detection and recovery mechanism or not. When the second terminal device supports the dynamic charging power detection and recovery mechanism, the maximum output current value (i.e., the first current value) may be used to reversely charge the second terminal device. When the second terminal device does not support the dynamic charging power detection and recovery mechanism, the reverse charging current value obtained by current limiting is used to reversely charge the second terminal device. In the embodiment of the present disclosure, since a minimum reverse charging current value obtained by current limiting is 0.75 A and the minimum reverse charging current value, compared with conventional 500 mA, is still 50% higher, the reverse charging current value used by the first terminal device to reversely charge the second terminal device is higher than the conventional reverse charging current value no matter whether the second terminal device supports the charging power detection and recovery mechanism or not.

In another embodiment of the present disclosure, for the second terminal device not supporting the dynamic charging power detection and recovery mechanism, for enabling the reverse charging current value acquired by the second terminal device to reach the first current value, a plugging and unplugging operation may be executed on the OTG adapter, and when the plugging and unplugging operation over the OTG adapter is detected, the first terminal device may reversely charge the second terminal device with the first current value.

Figure 4:
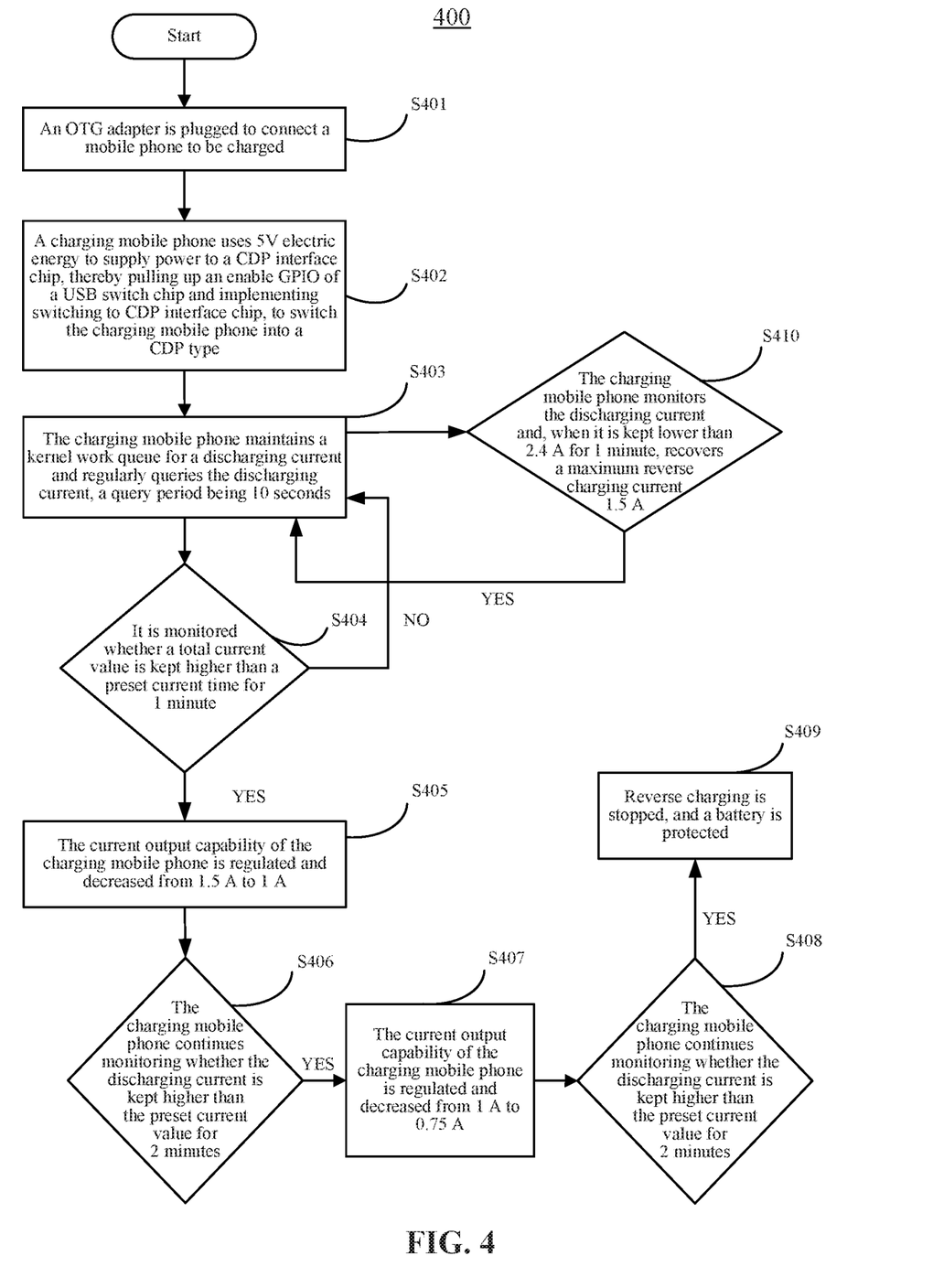
FIG. 4 is a flow chart of a method for regulating a reverse charging current according to an exemplary embodiment.

FIG. 4 is a flow chart of a method 400 for regulating a reverse charging current according to an embodiment of the present disclosure. The method 400 includes the following operations S401 to S410.

In S401, for a charging mobile phone, when an OTG adapter is plugged into an SDP, the charging mobile phone establishes a connection, through the OTG adapter, with a mobile phone to be charged.

In S402, the charging mobile phone uses a 5V electric voltage to supply power to a CDP interface chip, thereby pulling up an enable GPIO of a USB switch chip and implementing switching to a first link to the CDP interface chip, and a processor, the CDP interface chip, and the SDP further co-act to convert the charging mobile phone from an SDP mobile phone to a CDP mobile phone.

In S403, the charging mobile phone maintains a kernel work queue for a discharging current ibat, and the charging mobile phone regularly queries the discharging current ibat, a query period being 10 seconds.

In S404, it is monitored whether a total current value is kept higher than a preset current time for 1 minute, the preset current value being obtained by subtracting 50 mA from a maximum rated current specified for a battery and 50 mA being accuracy of an ADC. If so, in S405, the first terminal device regulates a current output capability and decreases an output reverse current value from 1.5 A to 1 A, otherwise continues monitoring in S406.

In S406, the charging mobile phone continues monitoring the discharging current ibat, and when the discharging current ibat is kept higher than the preset current value for 2 minutes, the first terminal device, in S407, regulates the current output capability and decreases the output reverse current value from 1 A to 0.75 A.

In S408, the charging mobile phone continues monitoring the discharging current ibat, and when the discharging current ibat is kept higher than the preset current value for 2 minutes, the first terminal device, in S409, stops reverse charging the second terminal device to protect a battery of the first terminal device.

In S410, in a process of reversely charging the second terminal device, when the reverse charging current has been limited and the discharging current is kept lower than 2.4 A for 1 minute, the maximum reverse charging current 1.5 A is recovered.

According to the method provided by the embodiment of the present disclosure, the total current value of the first terminal device is acquired in real time in the process of reversely charging the second terminal device, and the reverse charging current is regulated according to a relationship between the total current value and the rated current value of the battery, so that charging safety is ensured, and in addition, service life of the battery is prolonged.

Figure 5:
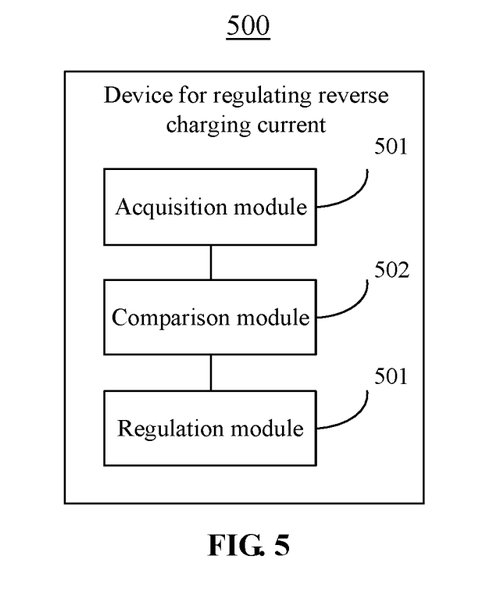
FIG. 5 is a block diagram of a device for regulating a reverse charging current according to an exemplary embodiment.

FIG. 5 is a block diagram of a device 500 for regulating a reverse charging current according to an exemplary embodiment. The device 500 is arranged in a first terminal device. Referring to FIG. 5, the device 500 includes an acquisition module 501, a comparison module 502 and a regulation module 503.

The acquisition module 501 is configured to acquire a total current value in a process of reversely charging a second terminal device through an OTG adapter, the total current value including a reverse charging current value and a value of current consumed by one or more application programs running on the first terminal device.

The comparison module 502 is configured to compare the total current value with a rated current value of a battery.

The regulation module 503 is configured to, when the total current value is kept higher than the rated current value in a preset time period, decrease the reverse charging current value.

In another embodiment of the present disclosure, the regulation module 503 is configured to, when the total current value is kept higher than the rated current value for a first preset time period, decrease the reverse charging current value from a first current value to a second current value, the first current value being an initial current value for reverse charging of the second terminal device and the first current value being higher than the second current value.

In another embodiment of the present disclosure, the regulation module 503 is configured to, when the total current value is kept higher than the rated current value for a second preset time period, decrease the reverse charging current value from the second current value to a third current value, the second current value being higher than the third current value.

In another embodiment of the present disclosure, the regulation module 503 is configured to, when the total current value is kept higher than the rated current value for a third preset time period, stop reversely charging the second terminal device.

In another embodiment of the present disclosure, the regulation module 503 is configured to, when it is detected that the total current value is kept lower than a specified current value for a fourth preset time period, reversely charge the second terminal device with the first current value, the first current value being the initial current value for reverse charging of the second terminal device.

In another embodiment of the present disclosure, the regulation module 503 is configured to, when a plugging and unplugging operation over the OTG adapter is detected, reversely charge the second terminal device with the first current value, the first current value being the initial current value for reverse charging of the second terminal device.

According to the device provided by the embodiment of the present disclosure, the total current value of the first terminal device is acquired in real time in the process of reversely charging the second terminal device, and the reverse charging current is regulated according to a relationship between the total current value and the rated current value of the battery, so that charging safety is ensured, and in addition, service life of the battery is prolonged.

With respect to the device in the above embodiment, the specific manners for performing operations for individual modules therein have been described in detail in the embodiment regarding the method, which will not be repeated herein.

Figure 6:
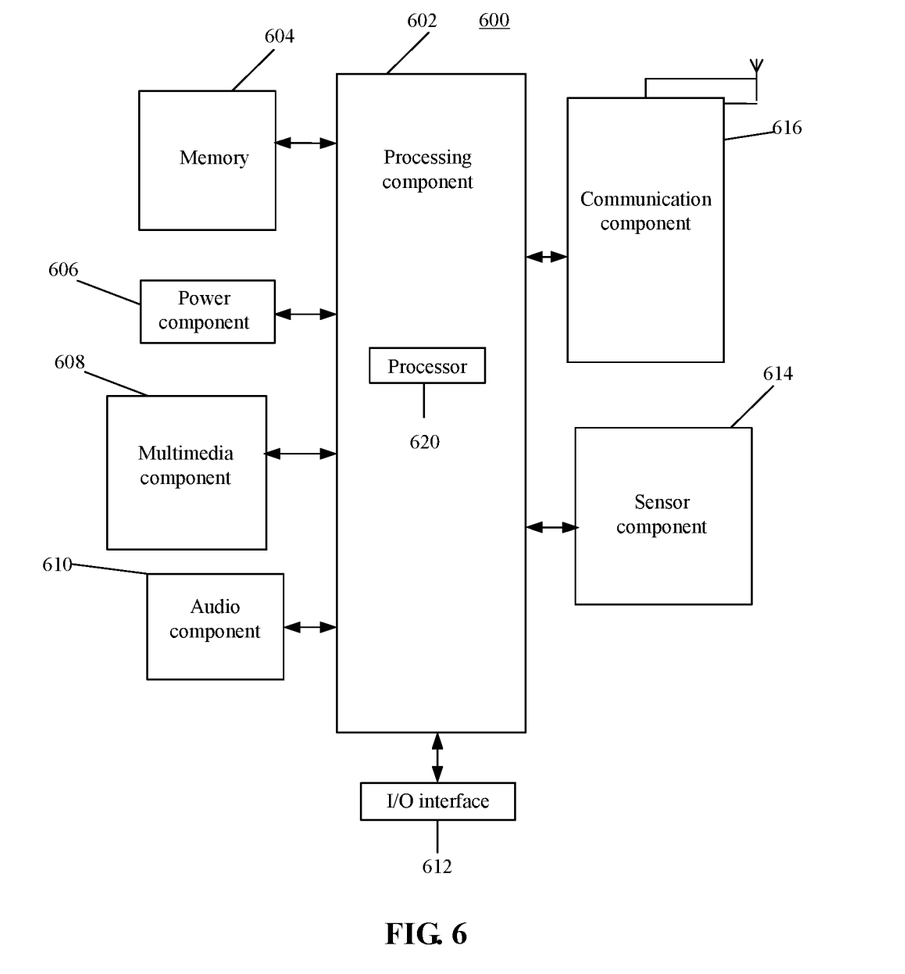
FIG. 6 is a block diagram of a device for regulating a reverse charging current according to an exemplary embodiment.

FIG. 6 is a block diagram of a terminal device 600 for regulating a reverse charging current according to an exemplary embodiment. For example, the device 600 may be a mobile phone, a computer, a digital broadcast terminal device, a messaging device, a gaming console, a tablet, a medical device, exercise equipment, a personal digital assistant and the like.

Referring to FIG. 6, the device 600 may include one or more of the following components: a processing component 602, a memory 604, a power component 606, a multimedia component 608, an audio component 610, an Input/Output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate interaction between the processing component 602 and the other components. For instance, the processing component 602 may include a multimedia module to facilitate interaction between the multimedia component 608 and the processing component 602.

The memory 604 is configured to store various types of data to support the operation of the device 600. Examples of such data include instructions for any application programs or methods operated on the device 600, contact data, phonebook data, messages, pictures, video, etc. The memory 604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 606 provides power for various components of the device 600. The power component 606 may include a power management system, one or more power supplies, and other components associated with generation, management and distribution of power for the device 600.

The multimedia component 608 includes a screen providing an output interface between the device 600 and a user. In some embodiments, the screen may include a Liquid Crystal Display (LCD) and a Touch Panel (TP). When the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 608 includes a front camera and/or a rear camera. The front camera and/or the rear camera may receive external multimedia data when the device 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a Microphone (MIC), and the MIC is configured to receive an external audio signal when the device 600 is in the operation mode, such as a call mode, a recording mode and a voice recognition mode. The received audio signal may further be stored in the memory 604 or sent through the communication component 616. In some embodiments, the audio component 610 further includes a speaker configured to output the audio signal.

The I/O interface 612 provides an interface between the processing component 602 and a peripheral interface module, and the peripheral interface module may be a keyboard, a click wheel, a button and the like. The button may include, but not limited to: a home button, a volume button, a starting button and a locking button.

The sensor component 614 includes one or more sensors configured to provide status assessment in various aspects for the device 600. For instance, the sensor component 614 may detect an on/off status of the device 600 and relative positioning of components, such as a display and small keyboard of the device 600, and the sensor component 614 may further detect a change in a position of the device 600 or a component of the device 600, presence or absence of contact between the user and the device 600, orientation or acceleration/deceleration of the device 600 and a change in temperature of the device 600. The sensor component 614 may include a proximity sensor configured to detect presence of an object nearby without any physical contact. The sensor component 614 may also include a light sensor, such as a Complementary Metal Oxide Semiconductor (CMOS) or Charge Coupled Device (CCD) image sensor, configured for use in an imaging application. In some embodiments, the sensor component 614 may also include an acceleration sensor, a gyroscope sensor, a magnetic sensor, a pressure sensor or a temperature sensor.

The communication component 616 is configured to facilitate wired or wireless communication between the device 600 and other equipment. The device 600 may access a communication-standard-based wireless network, such as a Wireless Fidelity (WiFi) network, a 2nd-Generation (2G) or 3rd-Generation (3G) network or a combination thereof. In an exemplary embodiment, the communication component 616 receives a broadcast signal or broadcast associated information from an external broadcast management system through a broadcast channel. In an exemplary embodiment, the communication component 616 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a Bluetooth (BT) technology and another technology.

In an exemplary embodiment, the device 600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 604 including an instruction, and the instruction may be executed by the processor 620 of the device 600 to implement the above described methods. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A reverse charging device, comprising:
a processor;
a standard downstream port (SDP);
a first link on which a charging downstream port (CDP) interface chip is arranged, wherein when it is detected that an adapter is plugged into the SDP, the processor is connected with the SDP through the first link, and the processor, the CDP interface chip, and the SDP form a CDP to perform reverse charging through the CDP and the adapter, the CDP having a current transmission capability higher than the SDP; and
a second link different from the first link, wherein the processor is connected with the SDP through the second link to perform forward charging based on an established connection.

2. The device of claim 1, further comprising a control Integrated Circuit (IC),
wherein during reverse charging, the control IC is configured to control a current value of a reverse charging current; and
wherein during forward charging, the control IC is configured to control a current value of a forward charging current.

3. The device of claim 1, further comprising a parasitic diode,
wherein during forward charging or reverse charging, the device reversely biases and turns off the parasitic diode by providing a preset voltage for the CDP interface chip.

4. A method for regulating a reverse charging current, applied to a first terminal device, the method comprising:
acquiring a total current value in a process of reversely charging a second terminal device through an adapter, the total current value including a reverse charging current value and a value of current consumed by one or more application programs running on the first terminal device;
comparing the total current value with a rated current value of a battery of the first terminal; and
when the total current value is kept higher than the rated current value for a preset time period, decreasing the reverse charging current value.

5. The method of claim 4, wherein decreasing the reverse charging current value when the total current value is kept higher than the rated current value for the preset time period comprises:
when the total current value is kept higher than the rated current value for a first preset time period, decreasing the reverse charging current value from a first current value to a second current value, the first current value being an initial current value for reverse charging of the second terminal device and the first current value being higher than the second current value.

6. The method of claim 5, after decreasing the reverse charging current value from the first current value to the second current value, further comprising:
when the total current value is kept higher than the rated current value for a second preset time period, decreasing the reverse charging current value from the second current value to a third current value, the second current value being higher than the third current value.

7. The method of claim 6, after decreasing the reverse charging current value from the second current value to the third current value, further comprising:
when the total current value is kept higher than the rated current value in for third preset time period, stopping reversely charging the second terminal device.

8. The method of claim 4, after decreasing the reverse charging current value, further comprising:
when it is detected that the total current value is kept lower than a specified current value for a fourth preset time period, reversely charging the second terminal device with the first current value, the first current value being an initial current value for reverse charging of the second terminal device.

9. The method of claim 4, after decreasing the reverse charging current value, further comprising:
when a plugging and unplugging operation on the adapter is detected, reversely charging the second terminal device with the first current value, the first current value being an initial current value for reverse charging of the second terminal device.

10. A first terminal device, comprising:
a processor; and
a memory configured to store an instruction executable by the processor,
wherein the processor is configured to:
acquire a total current value in a process of reversely charging a second terminal device through an adapter, the total current value including a reverse charging current value and a value of current consumed by one or more application programs running on the first terminal device;
compare the total current value with a rated current value of a battery of the first terminal; and
when the total current value is kept higher than the rated current value in a preset time period, decrease the reverse charging current value.

11. The first terminal of claim 10, wherein the processor is configured to:
when the total current value is kept higher than the rated current value for a first preset time period, decrease the reverse charging current value from a first current value to a second current value, the first current value being an initial current value for reverse charging of the second terminal device and the first current value being higher than the second current value.

12. The first terminal of claim 11, wherein after decreasing the reverse charging current value from the first current value to the second current value, the processor is further configured to:
when the total current value is kept higher than the rated current value for a second preset time period, decrease the reverse charging current value from the second current value to a third current value, the second current value being higher than the third current value.

13. The first terminal of claim 12, wherein after decreasing the reverse charging current value from the second current value to the third current value, the processor is further configured to:
when the total current value is kept higher than the rated current value for a third preset time period, stop reversely charging the second terminal device.

14. The first terminal of claim 10, wherein after decreasing the reverse charging current value, the processor is further configured to:
when it is detected that the total current value is kept lower than a specified current value for a fourth preset time period, reversely charge the second terminal device with the first current value, the first current value being an initial current value for reverse charging of the second terminal device.

15. The first terminal of claim 10, wherein after decreasing the reverse charging current value, the processor is further configured to:
when a plugging and unplugging operation on the adapter is detected, reversely charge the second terminal device with the first current value, the first current value being an initial current value for reverse charging of the second terminal device.

* * * * *